US012602995B2

(12) United States Patent
Uchiyama et al.

(10) Patent No.: US 12,602,995 B2
(45) Date of Patent: Apr. 14, 2026

(54) REAR VEHICLE APPROACH NOTIFICATION APPARATUS AND NOTIFICATION METHOD OF THE REAR VEHICLE APPROACH NOTIFICATION APPARATUS

(71) Applicant: TOYOTA JIDOSHA KABUSHIKI KAISHA, Toyota (JP)

(72) Inventors: Shunta Uchiyama, Toyota (JP); Jumpei Inagaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/018,467

(22) Filed: Jan. 13, 2025

(65) Prior Publication Data

US 2025/0336290 A1      Oct. 30, 2025

(30) Foreign Application Priority Data

Apr. 26, 2024    (JP) ................................. 2024-073120

(51) Int. Cl.
| | |
|---|---|
| *G08G 1/0967* | (2006.01) |
| *B60R 1/26* | (2022.01) |
| *G06V 20/58* | (2022.01) |
| *G06V 20/59* | (2022.01) |
| *H04N 7/18* | (2006.01) |
| *H04N 23/90* | (2023.01) |

(52) U.S. Cl.
CPC ............. *G08G 1/0967* (2013.01); *B60R 1/26* (2022.01); *G06V 20/58* (2022.01); *G06V 20/597* (2022.01); *H04N 7/181* (2013.01); *H04N 23/90* (2023.01); *B60R 2300/8066* (2013.01)

(58) Field of Classification Search
CPC .................... G08G 1/0967; B60R 1/26; B60R 2300/8066; G06V 20/597; G06V 20/58; H04N 7/181; H04N 23/90
See application file for complete search history.

(56) References Cited

U.S. PATENT DOCUMENTS

| | | | | |
|---|---|---|---|---|
| 8,638,237 B2 * | 1/2014 | Robaz | .................... | G08G 1/163 |
| | | | | 340/432 |
| 9,969,261 B2 | 5/2018 | Kodama | | |
| 10,045,173 B1 | 8/2018 | Morimura et al. | | |
| 10,106,157 B2 | 10/2018 | Sawada et al. | | |
| 10,116,873 B1 * | 10/2018 | Campbell | .............. | G06V 40/18 |
| 10,150,407 B2 | 12/2018 | Takahashi et al. | | |
| 10,696,297 B2 | 6/2020 | Nguyen Van et al. | | |
| 11,001,255 B2 | 5/2021 | Fukuman et al. | | |

(Continued)

FOREIGN PATENT DOCUMENTS

JP        2023104605 A      7/2023

*Primary Examiner* — Brian P Yenke
(74) *Attorney, Agent, or Firm* — Hunton Andrews Kurth LLP

(57) ABSTRACT

A rear vehicle approach notification apparatus includes an in-vehicle display, a speaker configured to output sound from a position different from the in-vehicle display to the driver, a first determination unit, a second determination unit, and a notification unit. The notification unit, when the first determination unit determines that a rear vehicle is approaching the host vehicle, performs the notification by displaying a rear vehicle approach display on the in-vehicle display without outputting sound from the speaker.

6 Claims, 3 Drawing Sheets

(56) References Cited

U.S. PATENT DOCUMENTS

| | | | |
|---|---|---|---|
| 11,110,937 B2 | 9/2021 | Kinoshita et al. | |
| 11,292,398 B2 * | 4/2022 | Jeong | B60R 1/24 |
| 11,618,469 B2 * | 4/2023 | Kokido | B60W 40/08 |
| | | | 340/435 |
| 12,139,072 B2 * | 11/2024 | Stent | G06V 20/597 |
| 12,515,520 B2 * | 1/2026 | Mimura | B60K 35/00 |
| 12,525,129 B2 * | 1/2026 | Takahashi | G08G 1/166 |
| 2012/0154491 A1 * | 6/2012 | Price | B41J 2/17556 |
| | | | 347/85 |
| 2015/0116197 A1 * | 4/2015 | Hamelink | G09G 3/003 |
| | | | 345/156 |
| 2018/0134285 A1 * | 5/2018 | Cho | H04N 23/90 |
| 2018/0357897 A1 * | 12/2018 | Weinfield | G08G 1/096758 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2021/0269055 A1 * | 9/2021 | Kokido | B60W 50/16 |
| 2021/0323484 A1 * | 10/2021 | Jeong | B60R 11/0235 |
| 2022/0189301 A1 * | 6/2022 | Nakazawa | G08G 1/09626 |
| 2022/0305912 A1 * | 9/2022 | Yokochi | B60K 35/60 |
| 2023/0107060 A1 * | 4/2023 | Takaaze | B60K 35/22 |
| | | | 701/36 |
| 2023/0286437 A1 * | 9/2023 | Stent | B60W 50/14 |
| 2023/0311755 A1 * | 10/2023 | Kominato | B60Q 5/006 |
| 2024/0208418 A1 * | 6/2024 | Faurie | B60K 35/26 |
| 2024/0239193 A1 * | 7/2024 | Sasaki | B60K 35/235 |

* cited by examiner

REAR VEHICLE APPROACH NOTIFICATION APPARATUS AND NOTIFICATION METHOD OF THE REAR VEHICLE APPROACH NOTIFICATION APPARATUS

CROSS-REFERENCE TO RELATED APPLICATIONS

This application is based upon and claims the benefit of priority from Japanese Patent Application No. 2024-073120, filed on Apr. 26, 2024, the entire contents of which are incorporated herein by reference.

TECHNICAL FIELD

The present disclosure relates to a rear vehicle approach notification apparatus and a notification method of the rear vehicle approach notification apparatus.

BACKGROUND

For example, Japanese Patent Application Laid-Open No. 2023-104605 describes a vehicle display system that is installed on the instrument panel in front of the driver's seat and includes a display device for making the driver visually recognize content.

SUMMARY

By the way, a rear vehicle approach notification apparatus that notifies the driver of a vehicle when a rear vehicle is approaching from behind is known. In this apparatus, when a rear vehicle approaches, a warning display is shown on the in-vehicle electronic inner mirror display, and sometimes a warning sound is emitted from the dashboard meter. However, in this apparatus, when the warning sound is output, the driver needs to check the meter and then look at the electronic inner mirror display, which causes the driver to move their line of sight, resulting in inconvenience. This may cause the driver to feel annoyed.

A rear vehicle approach notification apparatus according to one aspect of the present disclosure includes a rear camera mounted on a host vehicle and configured to capture an image of the rear side of the host vehicle, a driver monitor camera configured to capture a facial image of a driver of the host vehicle, an in-vehicle display configured to display the captured image to the driver, a speaker configured to output sound from a position different from the in-vehicle display to the driver, a first determination unit configured to determine whether a rear vehicle traveling behind the host vehicle is approaching the host vehicle, a second determination unit configured to determine whether the driver is viewing the in-vehicle display based on the facial image captured by the driver monitor camera, and a notification unit configured to notify the driver of the approach of the rear vehicle when the first determination unit determines that the rear vehicle is approaching the host vehicle. The notification unit, when the first determination unit determines that the rear vehicle is approaching the host vehicle, performs the notification by displaying a rear vehicle approach display on the in-vehicle display without outputting sound from the speaker. During the rear vehicle approach display on the in-vehicle display, if the second determination unit determines that the driver is viewing the in-vehicle display, the rear vehicle approach display on the in-vehicle display is continued. During the rear vehicle approach display on the in-vehicle display, if the second determination unit determines that the driver is not viewing the in-vehicle display, the rear vehicle approach display on the in-vehicle display is changed to an emphasized approach display, or sound output from the speaker is performed in addition to the rear vehicle approach display on the in-vehicle display.

According to one aspect of the present disclosure, it is possible to suppress the driver from feeling annoyed by the notification of the approach of the rear vehicle.

DETAILED DESCRIPTION

Hereinafter, an embodiment of the present disclosure will be described with reference to the drawings.

Figure 1:
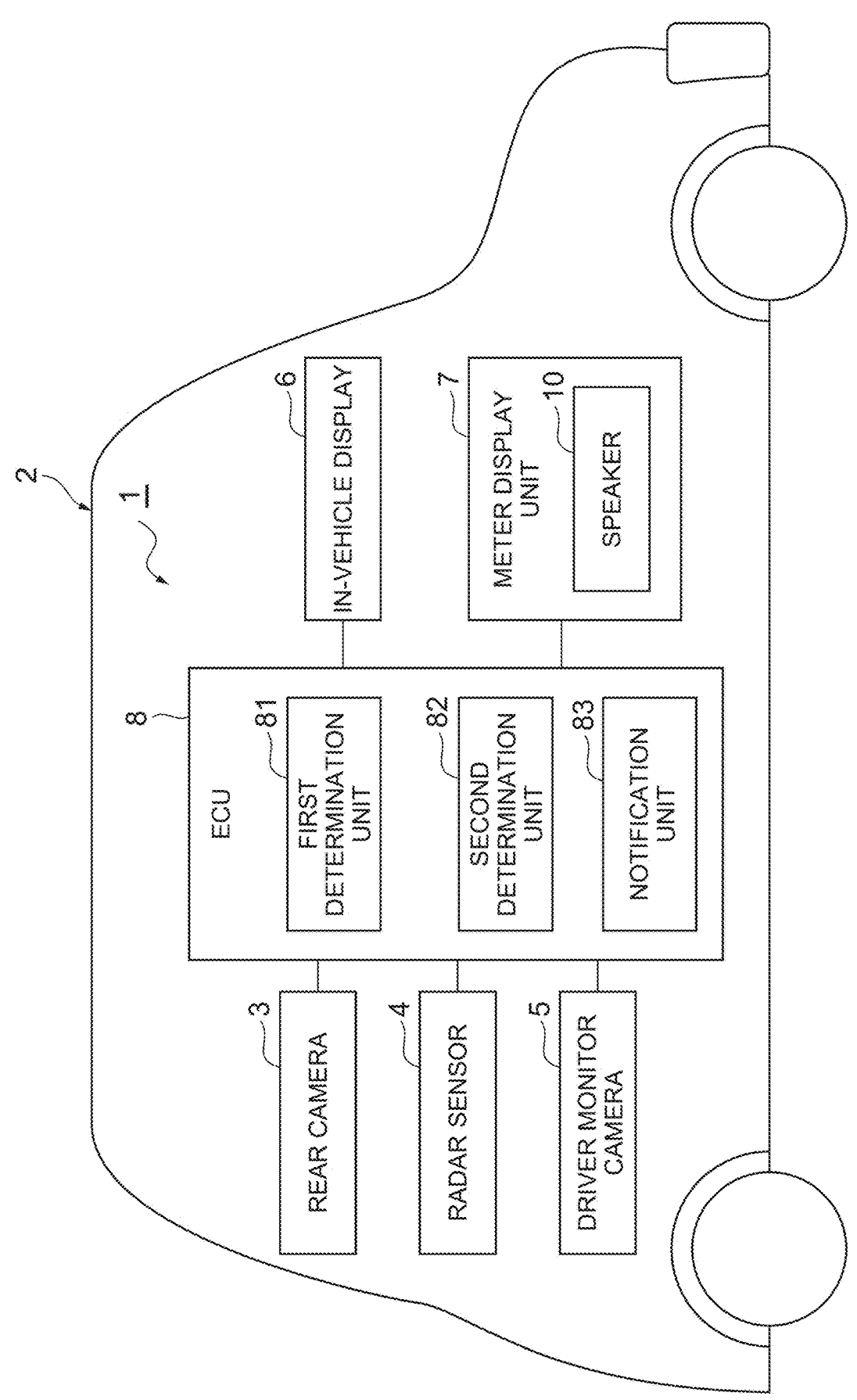
FIG. 1 is a block diagram showing a rear vehicle approach notification apparatus according to an embodiment.

FIG. 1 is a block diagram showing a rear vehicle approach notification apparatus according to an embodiment of the present disclosure. In FIG. 1, the rear vehicle approach notification apparatus 1 of the present embodiment is mounted on a host vehicle 2. The rear vehicle approach notification apparatus 1 includes a rear camera 3, a radar sensor 4, a driver monitor camera 5, an in-vehicle display 6, a meter display unit 7, and an ECU 8.

The rear camera 3 captures an image of the rear side of the host vehicle 2. The rear camera 3 is disposed at the rear side of the host vehicle 2. The rear camera 3 may be disposed above the license plate at the rear of the host vehicle 2, near the center of the rear bumper of the host vehicle 2, or attached to the upper part of the rear window from the inside.

The radar sensor 4 detects an object behind the host vehicle 2 by emitting radio waves (e.g., millimeter waves) or light. The radar sensor 4 includes, for example, a millimeter wave radar or a LiDAR (Light Detection and Ranging).

The driver monitor camera 5 captures a facial image of the driver of the host vehicle 2. The driver monitor camera 5 is provided, for example, on the cover of the steering column of the host vehicle 2.

Figure 2A:
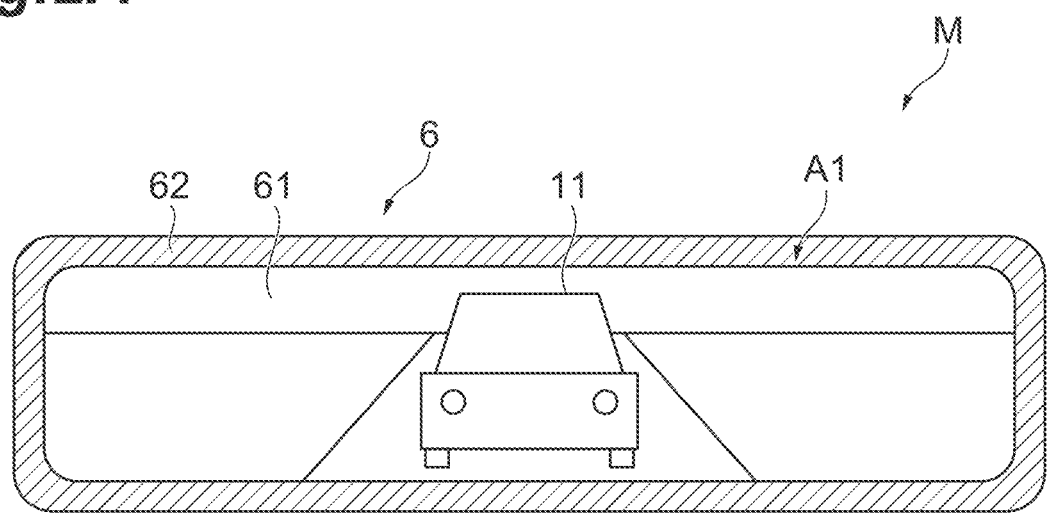
FIG. 2A is a diagram showing an example of a rear vehicle approach display on an electronic inner mirror display.

The in-vehicle display 6 displays the captured image of the rear camera 3 to the driver of the host vehicle 2. The in-vehicle display 6 is provided, for example, in front of the driver's seat in the cabin of the host vehicle 2. The in-vehicle display 6 is, for example, an electronic inner mirror display. The electronic inner mirror display is a display surface of an electronic inner mirror. The captured image of the rear camera 3 is projected on the display surface of the electronic inner mirror. Here, FIG. 2A shows an example of a rear vehicle approach display on the electronic inner mirror display. The rear vehicle approach display will be described in detail later.

The in-vehicle display 6 shown in FIG. 2A is a display surface including a main body 61 and an outer peripheral portion 62 surrounding the main body 61. The in-vehicle display 6 displays the captured image of the rear camera 3 on the main body 61. The in-vehicle display 6 may display the captured image on the entire area of both the main body 61 and the outer peripheral portion 62, or on a part of either the main body 61 or the outer peripheral portion 62. The outer peripheral portion 62 does not necessarily need to surround the entire circumference of the main body 61 and may be partially interrupted.

The meter display unit 7 is provided, for example, as part of the dashboard in front of the driver's seat in the cabin of the host vehicle 2. The meter display unit 7 is provided at a position different from the in-vehicle display 6. The meter display unit 7 displays, for example, a speed meter indicating the speed of the host vehicle 2 to the driver. The meter display unit 7 includes a built-in speaker 10. The speaker 10 outputs sound to the driver of the host vehicle 2. The speaker 10 outputs, for example, a warning sound to the driver of the host vehicle 2. The speaker 10 is provided at a position different from the in-vehicle display 6, similar to the meter display unit 7. Therefore, the speaker 10 outputs sound from a position different from the in-vehicle display 6 to the driver of the host vehicle 2.

The ECU 8 includes a CPU, RAM, ROM, and input/output interfaces. The ECU 8 loads a program recorded in the ROM into the RAM and executes the program loaded into the RAM with the CPU.

The ECU 8 includes a first determination unit 81, a second determination unit 82, and a notification unit 83. The first determination unit 81 determines whether a rear vehicle 11 traveling behind the host vehicle 2 is approaching the host vehicle 2. The determination of whether the rear vehicle 11 is approaching the host vehicle 2 is made, for example, based on a comparison between the relative distance between the host vehicle 2 and the rear vehicle 11 obtained by the radar sensor 4 and a predetermined threshold value for the relative distance.

The second determination unit 82 determines whether the driver is viewing the in-vehicle display 6 based on the facial image captured by the driver monitor camera 5. The second determination unit 82 identifies facial feature points from the facial image of the driver, tracks the center of the driver's pupils and reflection patterns, and recognizes the direction of the driver's line of sight. The facial feature points include, for example, eyes, nose, and mouth. The second determination unit 82 determines whether the driver is viewing the in-vehicle display 6 based on the direction of the driver's line of sight and the pre-stored position of the in-vehicle display 6.

The notification unit 83 notifies the driver of the approach of the rear vehicle 11 when the first determination unit 81 determines that the rear vehicle 11 is approaching the host vehicle 2. The notification unit 83 performs a rear vehicle approach display A1 on the in-vehicle display 6 as a notification corresponding to the approach of the rear vehicle 11. The rear vehicle approach display A1 is a display for notifying the driver of the approach of the rear vehicle 11. For example, the outer peripheral portion 62 is illuminated as the rear vehicle approach display A1 (see FIG. 2A). In FIG. 2A, the illuminated portion of the outer peripheral portion 62 (here, the entire outer peripheral portion 62) is hatched. The outer peripheral portion 62 is illuminated, for example, in amber. The color of the illuminated portion is not particularly limited and may be orange or the like. The rear vehicle approach display A1 is not limited to the above-described aspect. Various well-known display aspects can be adopted as the so-called Rear Vehicle Approach Indication (RVAI) display. The illuminated portion of the outer peripheral portion 62 may be the entire outer peripheral portion 62 or a part of the outer peripheral portion 62.

The notification unit 83 ends the rear vehicle approach display A1 when it is determined that the rear vehicle 11 is no longer approaching the host vehicle 2. The notification unit 83 may end the rear vehicle approach display A1 when a certain time has elapsed since the start of the rear vehicle approach display A1. Other well-known end conditions in the RVAI display can be adopted as the end conditions of the rear vehicle approach display A1.

The notification unit 83 continues the rear vehicle approach display A1 when the second determination unit 82 determines that the driver is viewing the in-vehicle display 6 during the rear vehicle approach display A1. The notification unit 83 may end the rear vehicle approach display A1 when the state in which the second determination unit 82 determines that the driver is viewing the in-vehicle display 6 continues for a predetermined time. The notification unit 83 may continue the rear vehicle approach display A1 until the predetermined time elapses even if the second determination unit 82 determines that the driver is viewing the in-vehicle display 6 when a certain time has elapsed since the start of the rear vehicle approach display A1.

The notification unit 83 performs an emphasized approach display A2 on the in-vehicle display 6 instead of the rear vehicle approach display A1 when the second determination unit 82 determines that the driver is not viewing the in-vehicle display 6 during the rear vehicle approach display A1. The emphasized approach display A2 is a display for alerting the driver who is not viewing the in-vehicle display 6. The emphasized approach display A2 may be any display aspect that attracts the driver's attention more than the rear vehicle approach display A1. This allows the approach of the rear vehicle 11 to be appropriately notified to the driver who is not viewing the in-vehicle display 6.

Figure 2B:
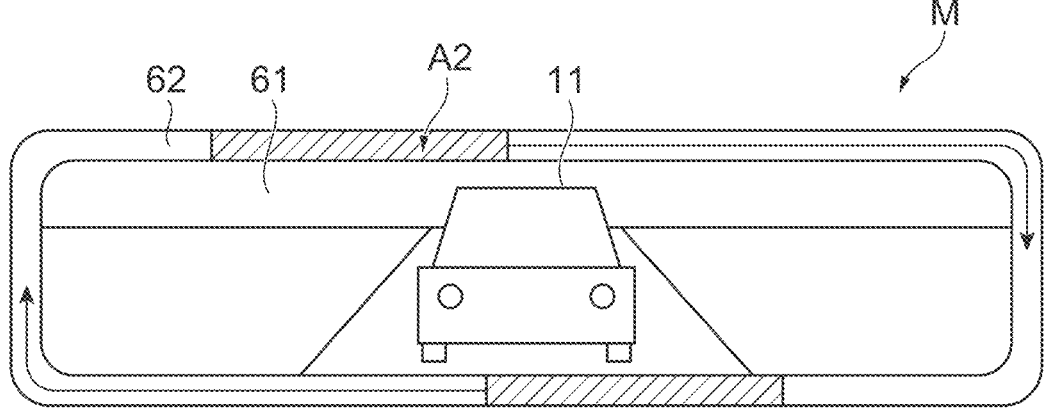
FIG. 2B is a diagram showing an example of an emphasized approach display on the electronic inner mirror display.

Here, FIG. 2B shows an example of the emphasized approach display A2 on the electronic inner mirror display. In FIG. 2B, the illuminated portion of the in-vehicle display 6 is shown by hatching. As shown in FIG. 2B, the notification unit 83 performs the emphasized approach display A2 by illuminating a part of the outer peripheral portion 62 and making the illuminated portion rotate around the main body 61. The rotating illuminated portion may be one location, two locations, or three or more locations. The rotating illuminated portion may blink. For example, the illuminated portion may blink twice at 0.5-second intervals. The blinking frequency is not particularly limited.

The notification unit 83 may change the color of the illuminated portion of the outer peripheral portion 62 shown in FIG. 2A to a color with higher visibility as the emphasized approach display A2. For example, the notification unit 83 may perform the emphasized approach display A2 by changing the color of the illuminated portion, which is amber in the rear vehicle approach display A1, to red. The notification unit 83 may change the color of the illuminated portion to a color with higher visibility in the aspect shown in FIG. 2B. The notification unit 83 may perform the emphasized approach display A2 by blinking the illuminated portion of the outer peripheral portion 62 shown in FIG. 2A. The notification unit 83 may perform both color change and blinking.

Alternatively, when the second determination unit 82 determines that the driver is not viewing the in-vehicle display 6 during the rear vehicle approach display A1, the notification unit 83 may continue the rear vehicle approach display A1 on the in-vehicle display 6 and perform sound output from the speaker 10. In this case, the notification unit 83 does not perform the emphasized approach display A2.

This allows the approach of the rear vehicle 11 to be appropriately notified to the driver who is not viewing the in-vehicle display 6.

The notification unit 83 may change the rear vehicle approach display A1 on the in-vehicle display 6 to the emphasized approach display A2 and perform sound output from the speaker 10. In this case, the approach of the rear vehicle 11 can be more appropriately notified to the driver compared to when only one of the emphasized approach display A2 on the in-vehicle display 6 or the sound output from the speaker 10 is performed.

Figure 3:
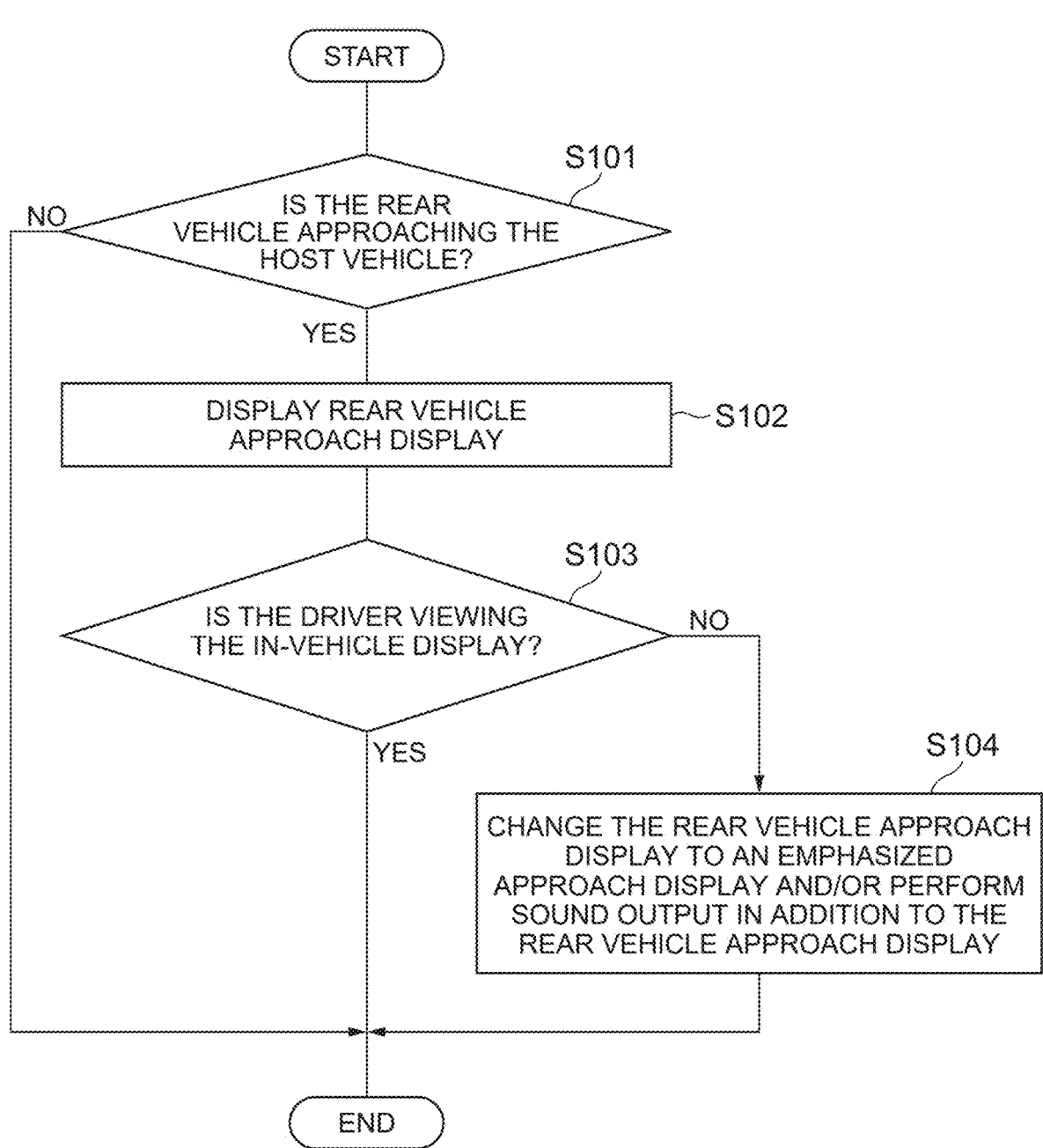
FIG. 3 is a flowchart showing a notification method of the rear vehicle approach notification apparatus according to an embodiment.

FIG. 3 is a flowchart showing a notification method of the rear vehicle approach notification apparatus 1. This notification method is executed by the first determination unit 81, the second determination unit 82, and the notification unit 83 in the ECU 8. This notification method is executed when the ignition switch of the host vehicle 2 is turned on. The notification method of the rear vehicle approach notification apparatus 1 includes a first determination step S101, a first notification step S102, a second determination step S103, and a second notification step S104.

In FIG. 3, first, the first determination unit 81 determines whether the rear vehicle 11 is approaching the host vehicle 2 (first determination step S101). When the first determination unit 81 determines that the rear vehicle 11 is approaching the host vehicle 2, the notification unit 83 performs the rear vehicle approach display A1 on the in-vehicle display 6 without performing sound output from the speaker 10 (first notification step S102). This notifies the driver of the approach of the rear vehicle 11. When the first determination unit 81 determines that the rear vehicle 11 is not approaching the host vehicle 2, the notification unit 83 does not notify the driver and ends the process of this notification method.

Next, the second determination unit 82 determines whether the driver is viewing the in-vehicle display 6 during the rear vehicle approach display A1 (second determination step S103). When the second determination unit 82 determines that the driver is viewing the in-vehicle display 6 during the rear vehicle approach display A1, the notification unit 83 continues the rear vehicle approach display A1 on the in-vehicle display 6 without performing sound output from the speaker 10. When the second determination unit 82 determines that the driver is not viewing the in-vehicle display 6 during the rear vehicle approach display A1, the notification unit 83 changes the rear vehicle approach display A1 on the in-vehicle display 6 to the emphasized approach display A2 or performs sound output from the speaker 10 in addition to the rear vehicle approach display A1 (second notification step S104).

As described above, in the present embodiment, when the second determination unit 82 determines that the driver is viewing the in-vehicle display 6 during the rear vehicle approach display A1, the notification unit 83 continues the rear vehicle approach display A1 on the in-vehicle display 6 without performing sound output from the speaker 10. This suppresses the driver from moving their line of sight between the in-vehicle display 6 and the speaker 10, thereby reducing the inconvenience for the driver. Therefore, it is possible to suppress the driver from feeling annoyed by the notification of the approach of the rear vehicle. Further, when the second determination unit 82 determines that the driver is not viewing the in-vehicle display 6 during the rear vehicle approach display A1, the notification unit 83 changes the rear vehicle approach display A1 on the in-vehicle display 6 to the emphasized approach display A2 or performs sound output from the speaker 10 in addition to the rear vehicle approach display A1. This allows the approach of the rear vehicle to be appropriately notified to the driver.

In the present embodiment, the outer peripheral portion 62 is illuminated as the rear vehicle approach display A1, and the outer peripheral portion 62 blinks as the emphasized approach display A2. This allows the approach of the rear vehicle 11 to be more appropriately notified to the driver.

Although the embodiment of the present disclosure has been described above, the present disclosure is not limited to the above-described embodiment. The present disclosure can be implemented in various forms with various modifications and improvements based on the knowledge of those skilled in the art.

For example, the distance between the host vehicle 2 and the rear vehicle 11 does not necessarily need to be obtained by the radar sensor 4 and may be obtained by the rear camera 3. Therefore, the determination of whether the rear vehicle 11 is approaching the host vehicle 2 may be made based on a comparison between the distance between the host vehicle 2 and the rear vehicle 11 obtained by the rear camera 3 and a predetermined threshold value for the distance.

The outer peripheral portion 62 does not necessarily need to be illuminated as the rear vehicle approach display A1. Characters or marks may be displayed on the in-vehicle display 6 as the rear vehicle approach display A1. The outer peripheral portion 62 does not necessarily need to blink as the emphasized approach display A2. Characters or marks may blink on the in-vehicle display 6 as the emphasized approach display A2.

In the emphasized approach display A2, the entire in-vehicle display 6, including the main body 61, may be illuminated or blink. In the emphasized approach display A2, the display aspect may be changed according to the distance between the host vehicle 2 and the rear vehicle 11. The notification unit 83 may change the color of the illuminated or blinking portion to a color closer to red as the distance between the host vehicle 2 and the rear vehicle 11 decreases. The notification unit 83 may increase the area of the illuminated or blinking portion as the distance between the host vehicle 2 and the rear vehicle 11 decreases. The notification unit 83 may shorten the blinking cycle of the blinking portion as the distance between the host vehicle 2 and the rear vehicle 11 decreases. The notification unit 83 may increase the rotation speed of the illuminated portion shown in FIG. 2B as the distance between the host vehicle 2 and the rear vehicle 11 decreases. Instead of the distance between the host vehicle 2 and the rear vehicle 11, the collision margin time may be used.

The notification unit 83 may change the display aspect according to the type of the rear vehicle 11. For example, when the rear vehicle 11 is a large vehicle such as a bus or truck, the notification unit 83 may change the color of the illuminated or blinking portion to a color closer to red compared to when the rear vehicle 11 is a medium-sized vehicle such as a passenger car. The notification unit 83 may increase the area of the illuminated or blinking portion when the rear vehicle 11 is a large vehicle compared to when the rear vehicle 11 is a medium-sized vehicle. The notification unit 83 may shorten the blinking cycle of the blinking portion when the rear vehicle 11 is a large vehicle compared to when the rear vehicle 11 is a medium-sized vehicle. The notification unit 83 may increase the rotation speed of the illuminated portion shown in FIG. 2B when the rear vehicle 11 is a large vehicle compared to when the rear vehicle 11 is a medium-sized vehicle.

The speaker for notifying the approach of the rear vehicle 11 by sound output is not limited to the speaker 10 built into the meter display unit 7. The speaker may be provided at a position different from the in-vehicle display 6. The speaker may be provided inside the door of the driver's seat of the host vehicle 2, on the upper part of the dashboard, or inside the A-pillar. The in-vehicle display 6 is not limited to the electronic inner mirror display. The in-vehicle display 6 may be any display provided at a position different from the speaker 10 that outputs sound when the rear vehicle approaches. The in-vehicle display 6 may be a center display. The center display is a display provided in the central part of the dashboard between the driver's seat and the passenger seat. The in-vehicle display 6 may be a head-up display that projects onto the windshield of the host vehicle 2.

What is claimed is:

1. A rear vehicle approach notification apparatus, comprising:
    a rear camera configured to capture an image of a rear side of a host vehicle;
    a driver monitor camera configured to capture a facial image of a driver of the host vehicle;
    an in-vehicle display configured to display the captured image to the driver;
    a speaker configured to output sound from a position different from the in-vehicle display to the driver;
    a first determination unit configured to determine whether a rear vehicle traveling behind the host vehicle is approaching the host vehicle;
    a second determination unit configured to determine whether the driver is viewing the in-vehicle display based on the facial image captured by the driver monitor camera; and
    a notification unit configured to notify the driver of the approach of the rear vehicle when the first determination unit determines that the rear vehicle is approaching the host vehicle,
    wherein the notification unit, when the first determination unit determines that the rear vehicle is approaching the host vehicle, performs the notification by displaying a rear vehicle approach display on the in-vehicle display without outputting sound from the speaker,
wherein, during the rear vehicle approach display on the in-vehicle display, if the second determination unit determines that the driver is viewing the in-vehicle display, the rear vehicle approach display on the in-vehicle display is continued, and
    wherein, during the rear vehicle approach display on the in-vehicle display, if the second determination unit determines that the driver is not viewing the in-vehicle display, the rear vehicle approach display on the in-vehicle display is changed to an emphasized approach display, or sound output from the speaker is performed in addition to the rear vehicle approach display on the in-vehicle display.

2. The rear vehicle approach notification apparatus according to claim 1,
    wherein the in-vehicle display includes a main body and an outer peripheral portion surrounding the main body,
    wherein the outer peripheral portion is illuminated as the rear vehicle approach display, and
    wherein the outer peripheral portion is blinked as the emphasized approach display.

3. The rear vehicle approach notification apparatus according to claim 2,
    wherein the notification unit, during the rear vehicle approach display on the in-vehicle display, if the second determination unit determines that the driver is not viewing the display, changes the rear vehicle approach display on the in-vehicle display to the emphasized approach display and performs sound output from the speaker.

4. The rear vehicle approach notification apparatus according to claim 1,
    wherein the notification unit, during the rear vehicle approach display on the in-vehicle display, if the second determination unit determines that the driver is not viewing the display, changes the rear vehicle approach display on the in-vehicle display to the emphasized approach display and performs sound output from the speaker.

5. A notification method of a rear vehicle approach notification apparatus equipped with a rear camera mounted on a host vehicle to capture an image of a rear side of the host vehicle, a driver monitor camera configured to capture a facial image of a driver of the host vehicle, an in-vehicle display configured to display the captured image to the driver, and a speaker configured to output sound from a position different from the in-vehicle display to the driver, the method comprising:
    a first determination step of determining whether a rear vehicle is approaching the host vehicle;
    a second determination step of determining whether the driver is viewing the in-vehicle display based on the facial image captured by the driver monitor camera when the rear vehicle traveling behind the host vehicle is approaching the host vehicle; and
    a notification step of notifying the driver of the approach of the rear vehicle when the first determination step determines that the rear vehicle is approaching the host vehicle,
    wherein, in the notification step, when the first determination step determines that the rear vehicle is approaching the host vehicle, the notification is performed by displaying a rear vehicle approach display on the in-vehicle display without outputting sound from the speaker,
    wherein, during the rear vehicle approach display on the in-vehicle display, if the second determination step determines that the driver is viewing the in-vehicle display, the rear vehicle approach display on the in-vehicle display is continued, and
    wherein, during the rear vehicle approach display on the in-vehicle display, if the second determination step determines that the driver is not viewing the in-vehicle display, the rear vehicle approach display on the in-vehicle display is changed to an emphasized approach display, or sound output from the speaker is performed in addition to the rear vehicle approach display on the in-vehicle display.

6. A rear vehicle approach notification apparatus, comprising:
    a rear camera configured to capture an image of a rear side of a host vehicle;
    a driver monitor camera configured to capture a facial image of a driver of the host vehicle;
    an in-vehicle display configured to display the captured image to the driver;
    a speaker configured to output sound from a position different from the in-vehicle display to the driver;
    a processor configured to:
        determine whether a rear vehicle traveling behind the host vehicle is approaching the host vehicle;

determine whether the driver is viewing the in-vehicle display based on the facial image captured by the driver monitor camera; and notify the driver of the approach of the rear vehicle when the rear vehicle is approaching the host vehicle, wherein the processor, when the rear vehicle is approaching the host vehicle, performs the notification by displaying a rear vehicle approach display on the in-vehicle display without outputting sound from the speaker, wherein, during the rear vehicle approach display on the in-vehicle display, if the processor determines that the driver is viewing the in-vehicle display, the rear vehicle approach display on the in-vehicle display is continued, and wherein, during the rear vehicle approach display on the in-vehicle display, if the processor determines that the driver is not viewing the in-vehicle display, the rear vehicle approach display on the in-vehicle display is changed to an emphasized approach display, or sound output from the speaker is performed in addition to the rear vehicle approach display on the in-vehicle display.

* * * * *